United States Patent [19]

Spears

[11] Patent Number: 5,317,880

[45] Date of Patent: Jun. 7, 1994

[54] AUXILIARY BRAKING AND COOLING DEVICE

[76] Inventor: Dan E. Spears, 3515 Westfield Dr., Brandon, Fla. 33511

[21] Appl. No.: 871,187

[22] Filed: Apr. 20, 1992

[51] Int. Cl.$^5$ ............................................. B60H 1/32
[52] U.S. Cl. ...................................... 62/239; 62/507; 188/71.6; 188/264 A; 296/180.3
[58] Field of Search ................ 62/239, 507; 188/71.6, 188/264 R, 264 A, 264 AA; 296/180.1, 180.3, 180.5

[56] References Cited

U.S. PATENT DOCUMENTS

| | | | |
|---|---|---|---|
| 2,136,472 | 11/1938 | Sinclair | 188/264 R |
| 3,834,923 | 1/1976 | Lissaman et al. | 296/180.3 X |
| 4,567,734 | 2/1986 | Dankowski | 62/507 X |
| 4,693,506 | 9/1987 | Massengill | 296/180.3 |
| 4,772,299 | 9/1988 | Bogusz | 188/71.6 X |
| 4,805,747 | 2/1989 | Moedinger et al. | 188/264 X |
| 5,092,648 | 3/1992 | Spears | 296/180.3 X |
| 5,121,818 | 6/1992 | McComic | 188/264 A X |

FOREIGN PATENT DOCUMENTS 958180  9/1982  U.S.S.R. ............................. 188/71.6

Primary Examiner—William E. Tapolcai

[57] ABSTRACT

An apparatus to control the air as it passes a tractor trailer combination as they travel along a road. This device will allow for variable redirection of the air flow to allow various desired effects to be met. The flow of air is streamlined to minimize the effects of cross winds. Air pressure responsive plates are provided at the ends of laterally extending gates mounted on tractor trailer combinations to minimize the effects of sudden drafts of air that sweep across roadways. A method of redirecting the air flow for ventilation and cooling purposes for both refrigeration units and brake components is provided. Air ducts are provided for the transport of the redirected air for the ventilation and cooling of the brake components. Additionally the air flow can be directed to impact with the exterior vertical front face of the trailer section to create an air drag which will create resistance to forward travel. Deflection protection is provide for the vehicle as a whole and for the refrigeration unit specifically.

1 Claim, 20 Drawing Sheets

AUXILIARY BRAKING AND COOLING DEVICE

BACKGROUND OF THE INVENTION

Heretofore the streamlining of the area between the cab top of the tractor vehicle and the upper front face of the trailer vehicle have been streamlined to reduce the resistance to travel.

I have now devised a construction wherein the end walls between the cab top and the upper front wall of the trailer vehicle can be pressure actuated to counter balance in part the effect of cross winds.

A further important feature of this invention is to provide cooling air to the refrigeration units, and to the provision of cooling air to keep the brakes from over heating and becoming ineffective to slow down and stop the vehicle.

FIELD OF THE INVENTION

An important feature of this invention resides in the automatic reduction of the effects of cross winds by the pressure actuated opening of the side portals which reduces to some extent the effect of the cross-wind thereby reducing the dangerous effects resulting from cross-winds which frequently vary to a considerable degree and result in dangerous situations.

The effect of erratic operation of the brakes results in "fish-tailing" of the vehicle in the event that the brakes on the tractor vehicle exert a greater proportion of the total braking effect than they are suppose to exert.

Under those conditions, the tractor vehicle brakes exert a greater effect on the total braking effort than their rightful proportion, dependent on the total braking effort being exerted. As a result, the front truck brakes that is the brakes on the truck unit exert a higher proportion of the total braking effort than desired. As a result, the brakes on the rear trailer do not carry their proper share of the braking load resulting in a break down of the overall balance of the brake loading. As a result, the trailer loading jams into the truck loading which has a higher effective loading than is desired which as a result the overall loading "fish-tails", as we say, where the rear loading jams into the braking effort exerted by the front truck brakes, and control of the vehicle is lost.

DESCRIPTION OF THE PRIOR ART

While we are knowledgeable of the patent situation relative to the gates on the truck cab to streamline the flow of air over the cargo carrier, we are not knowledgeable relative to the air actuated gates for reducing cross wind interference and the use of the vehicle brakes. Also, we are not knowledgeable as to the use of the air flow to cool refrigeration units, and brakes.

SUMMARY OF THE INVENTION

Over heating of brake pads cause substantial danger to tractor-trailer units because in a long down hill run the brakes must be set with varying degrees of severity from the beginning of the down hill run to the bottom of the hill, and there is no time to ease off or change the severity of the brake application to permit the brakes and the associated elements to cool off. In fact, it is not uncommon for the elements surrounding the brakes to actually catch fire and burn, nor the effectiveness of the brakes to diminish as they heat up.

I have devised an improved method of opening the front panel gates to admit auxiliary air to strike the substantially flat upstanding front surface of trailer to establish an auxiliary braking force tending to slow down the tractor-trailer unit.

I have succeeded in providing a control element having an elongated rods operably connected to the transversely extending gates to elevate all of the gates even though they are of different lengths simultaneously.

I have succeeded in providing an air duct assembly having an intake mounted directly behind the movable gates for redirecting the air flow into and through the air duct to the lower chassis area for ventilating and cooling of the vehicles wheel brakes.

I have succeeded in providing a design of flat segmented sectional panels bonded together with sharp radius curved edges and intersecting points to permit an increase in velocity of air flow due to the rapid angular surface changes in line with the air flowing from the front of the vehicle to the rear.

I have devised an improved method of providing the movable gate assembly to be attached to the vehicle without the embodiment of a fairing structure.

I have devised an air intake located behind the movable gates for intercepting the redirected air flow and channeling to the under carriage of the vehicle for cooling of the brakes loaded in the tractor and trailer chassis.

BRIEF DESCRIPTION OF THE DRAWINGS

Referring now to the drawings, wherein similar parts are identified by similar reference numerals throughout the several views.

FIG. 8 is also a side view drawing to show the plurality of movable door panels in the close position and utilizing a bushing mounted slide bar linkage designed attached to pneumatic actuators having each movable panel connected by means of matched bar links having pins on each end for allowing the bar links to pivot freely as the busing mounted slide bar is moved forward as in the direction of the arrow.

Is also a side view of the air duct design mounted to the vehicle for rerouting the redirected air of the movable door panels to supply the additional wheel brake air movement for cooling and ventilation of the mechanical components located in the vehicles chassis.

Figure 15:
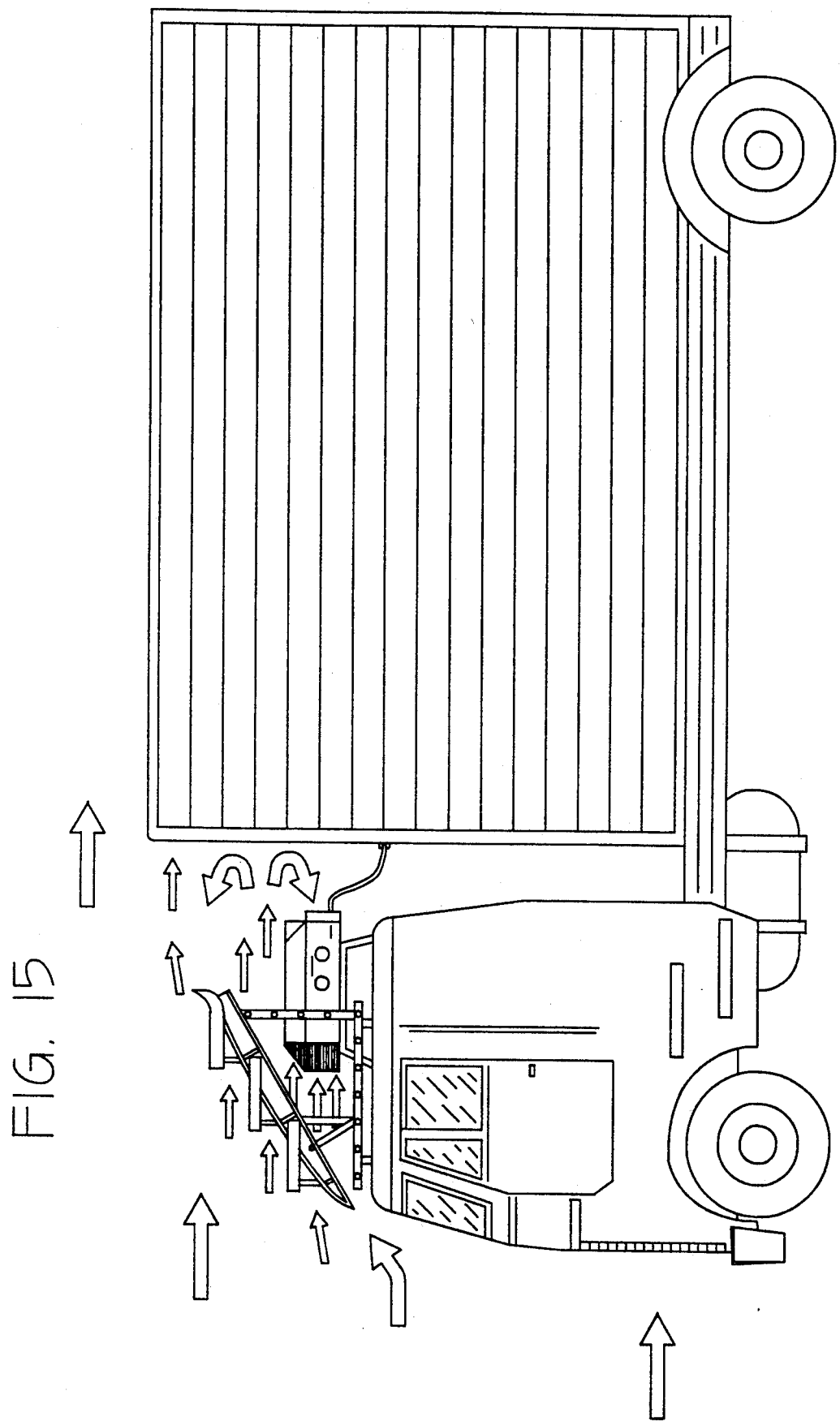

FIG. 15 is a side view of the plurality of movable door panels providing a redirected air supply while in the open position for use in cooling and ventilation of the cab roof top mounted cooler or air conditioning unit and to provide air drag and forward notion resistance while operator is slowing or prior to and during the usage of the mechanical wheel brakes.

Is also a side view of usage of the plurality of movable door panels for slowing and ventilation of components to vehicles not large enough to utilize the swivel (5th wheel) trailer coupling.

Figure 16:
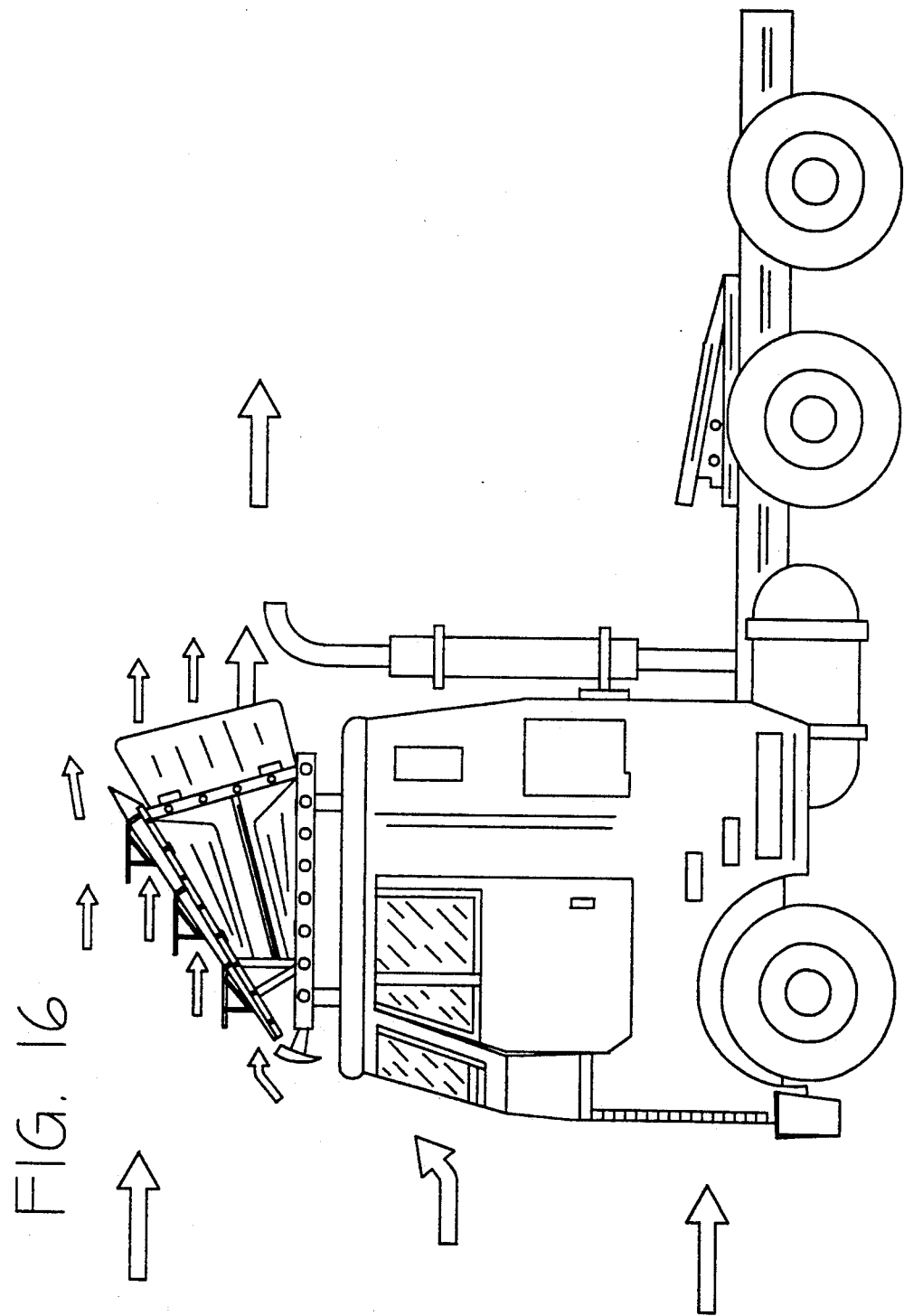

FIG. 16 is a side view of the plurality of top movable door panels along with the retracted side extender panels and the movable side panels attached to the variable door panel assembly locked in the open position while vehicle is traveling without a trailer and therefore does not require aerodynamic fairing capability for the cargo compartment.

Figure 17:
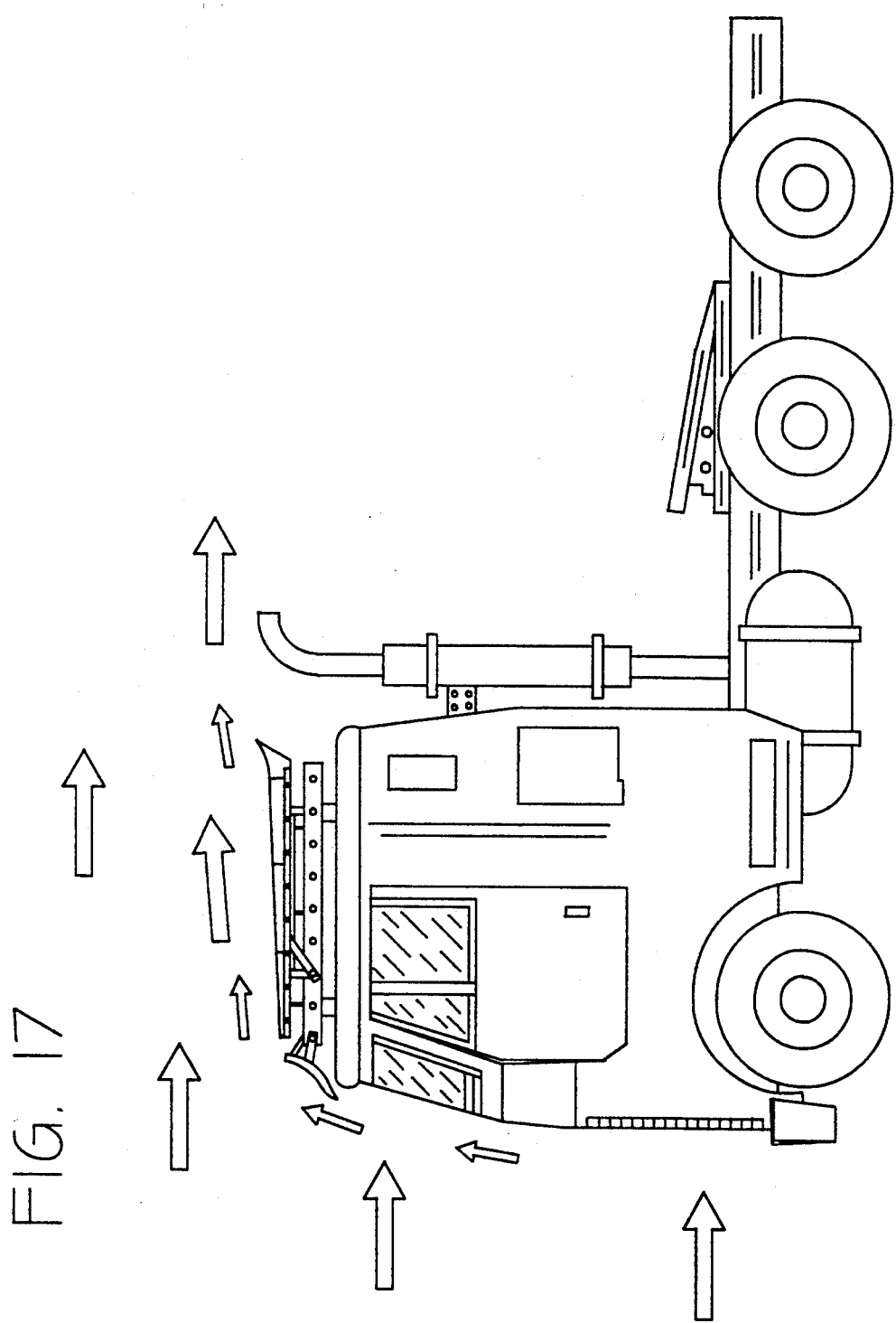

FIG. 17 is a side view of the plurality of the top movable door panels in the close position and mechanically attached in the lowered horizontal position while not in use such as traveling without a trailer, towing backwards, shipping of vehicle from manufacturer, and during other maintenance conditions.

Figure 18:
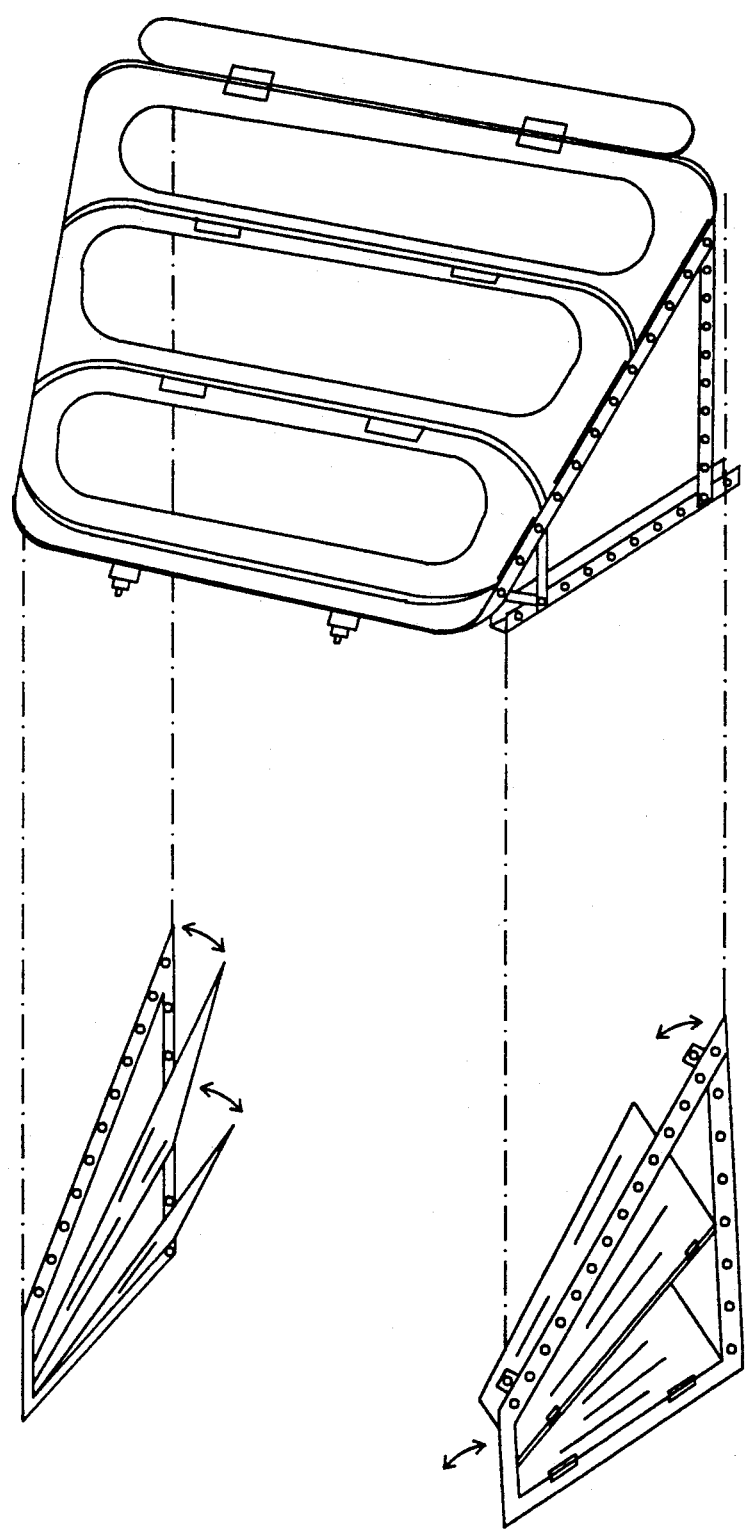

FIG. 18 is an angle view showing the plurality of movable door panels hinge at rear trailer edges and in the close position, a view of the top rear movable spoiler hinged at the front edge of spoiler panel and attached to the rear structural cross horizontal member, a view of the front movable spoiler hinged at the front edge of the spoiler panel and attached to the front cross member of the structural frame assembly supporting the movable panel assemblies, a view of the side movable panel assemblies attachable to the side structural frame assemblies of the plurality of movable panel support members.

Figure 19:
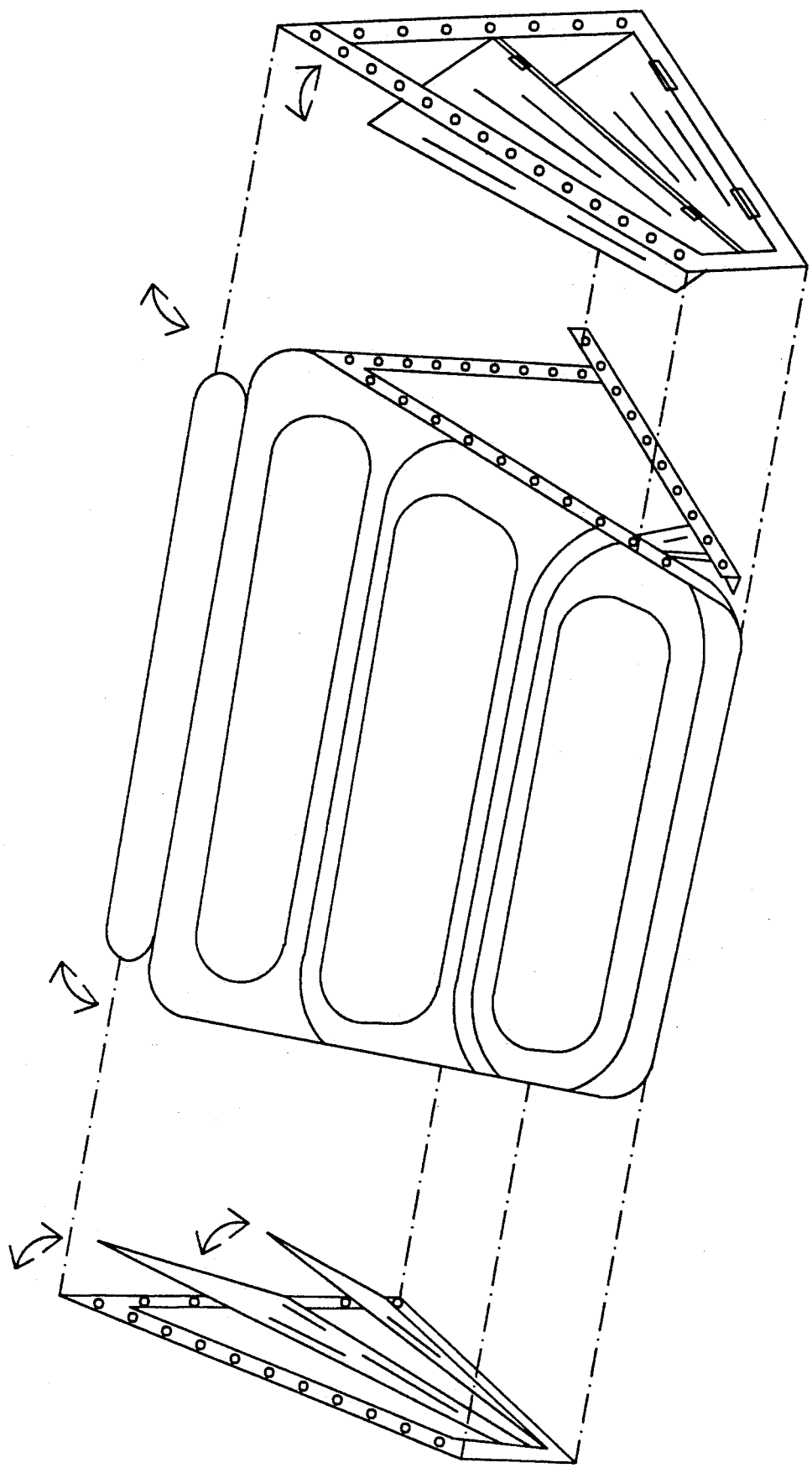

FIG. 19 is an angle view of the plurality of door panel assemblies showing the raised portions of the built-in rib supports for each panel and the variable applications of attaching the side movable panels by hinging each panel at the lower edge or base of each variable panel.

Figure 20:
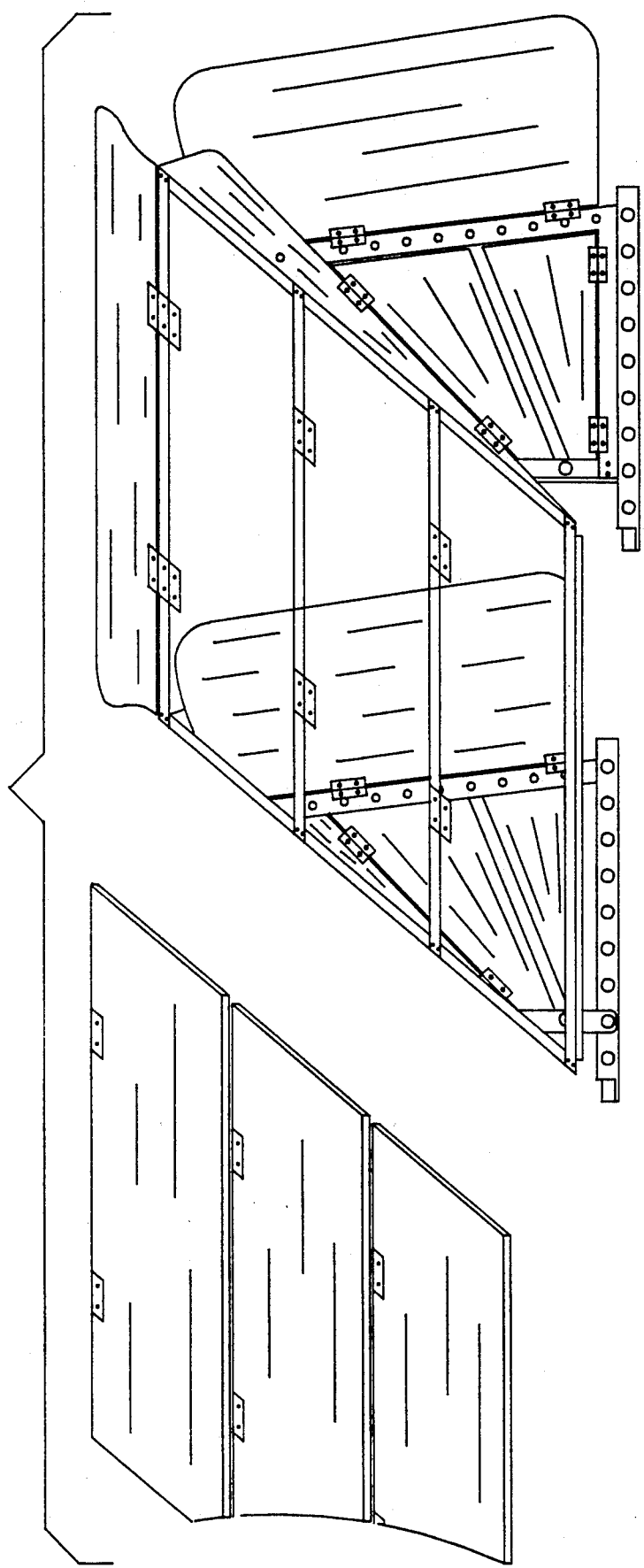

FIG. 20 is a detached drawing of the top main plurality of movable panels revealing the structural cross member ribs for each movable panel with the hinges mounted and for attachment to the rear edge of each panel.

Is also a drawing showing the side movable panels hinged to allow the side movable panel to open inward providing an opening for air flow at the middle of the side structural areas.

Is also a drawing to show the rear side extended movable panel to be hinged at the leading or forward edge of the panel and to be attached to the side rear support structural member by movable hinges.

Is also a drawing to show side spoilers attached to the structural side member of the top plurality of movable panels and extending outwardly over the side mounted movable panels.

Figure 21A:
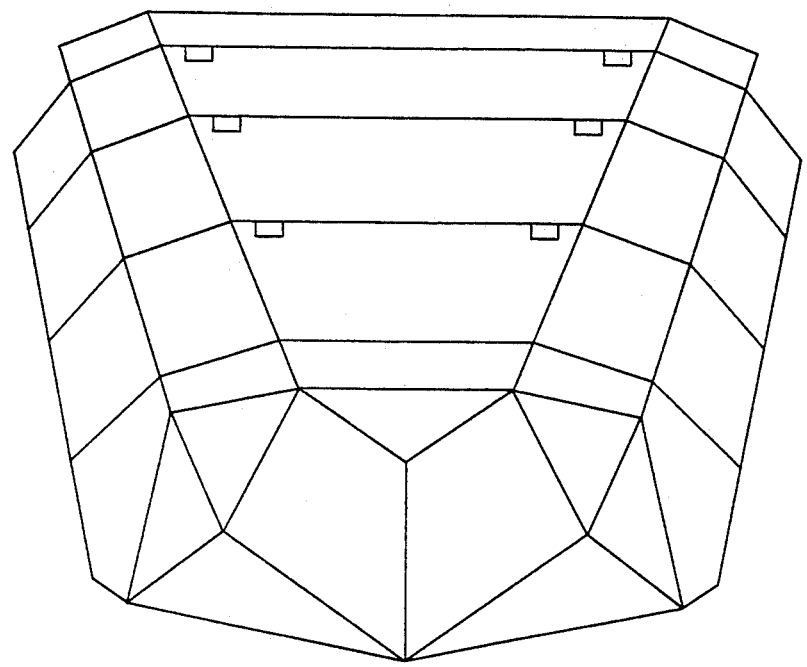

FIG. 21A is a front view of the flat segmented built-up deflector panel.

Figure 21B:
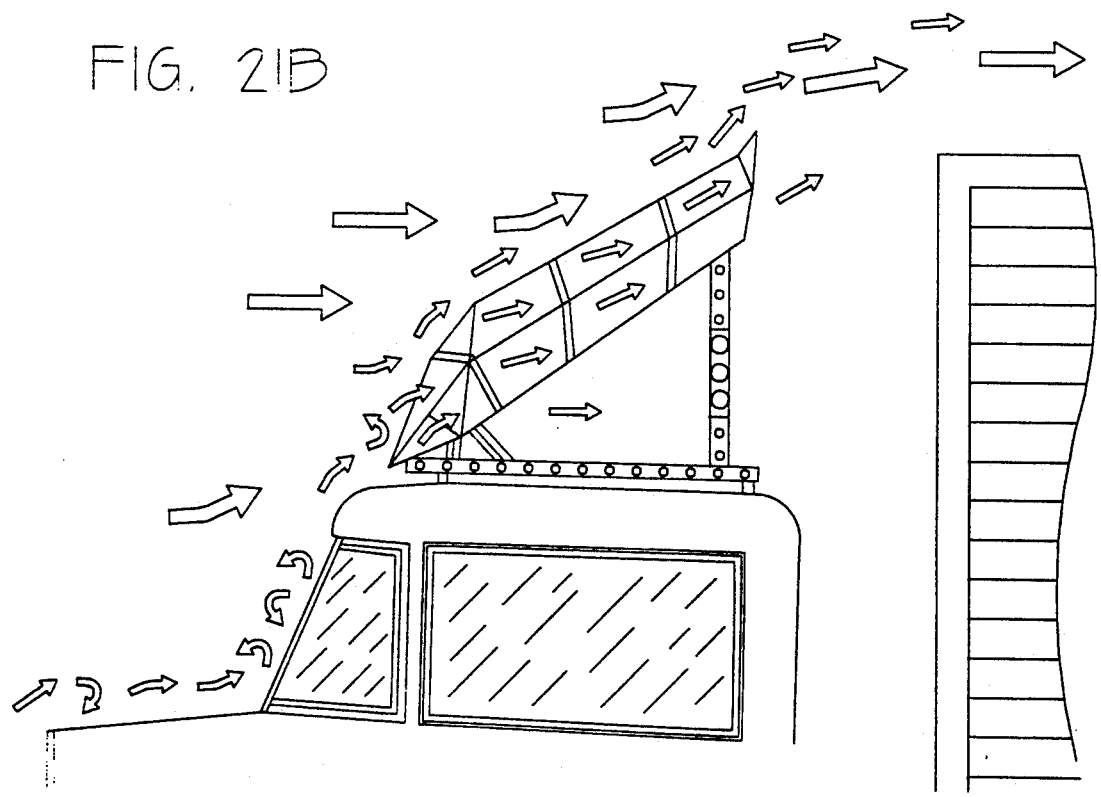

FIG. 21b is a side view of the flat segmented built-up deflector panel for use in fairing and realigning the turbulent air flowing over and past the hood, windshield, and fenders of the front surfaces of the vehicle to effectively reduce the turbulent air from being engulfed between the tractor cab and the cargo compartment.

Figure 22:
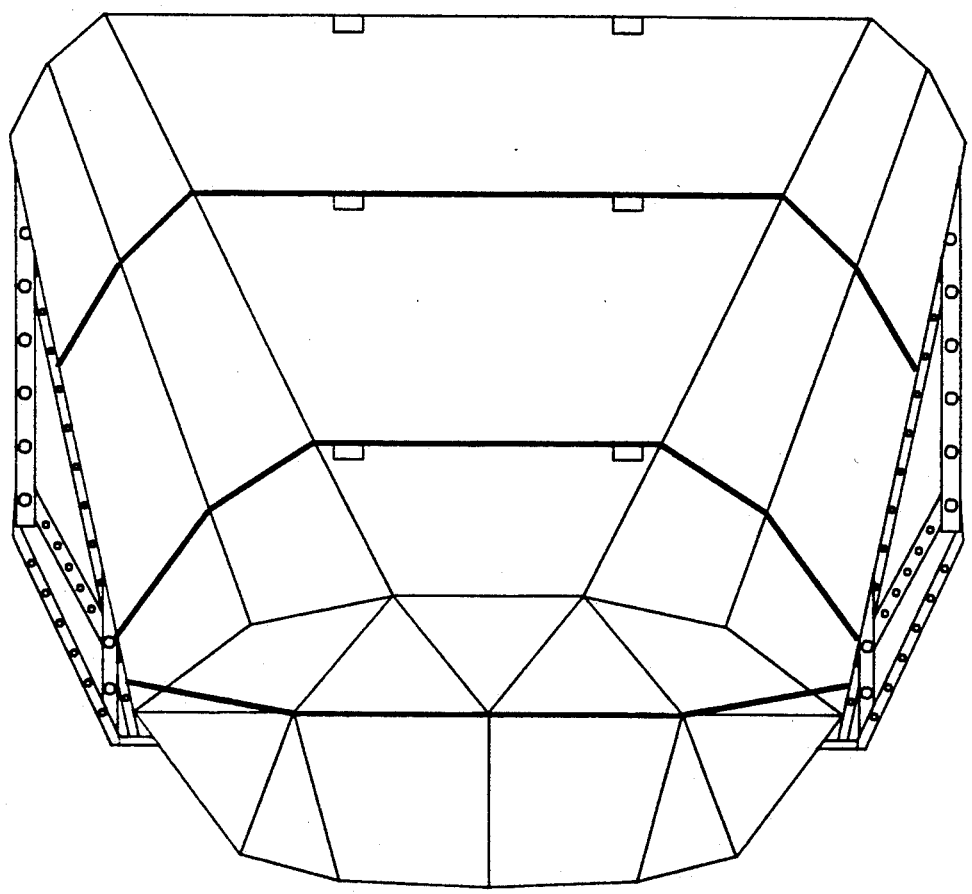

FIG. 22 is a front view of the flat panel segmented sections bonded together in movable door gate sections and retract in the close position for fairing the air flow over and past the truck assembly.

DESCRIPTION OF THE PREFERRED EMBODIMENT

This invention uses at least two pneumatically driven actuators per arrangement for each set of plurality of variable inlet guide door panels whether vertically or horizontally mounted. These actuators are preferably designed and applied to provide dual pneumatic action to move the door panels to the open position as well as pneumatic air pressure is required to return the door panels to the close position. Further application of a separately mounted spring assembly to load the door panel mechanical linkages is designed to move the plurality of variable air deflector doors whether vertically or horizontally mounted to the open position when the air pressure for actuator operation is lost or electrical power supplying the vehicle is lost. This design concept is a safety feature allowing a forward motion resistance due to air drag to occur during emergency conditions when the vehicle loses air pressure for operating the mechanical brakes on the tractor chassis wheels. This principle design concept is to provide excessive air drag when the vehicle has no other conventional pneumatic mechanical means of reducing forward motion of the tractor vehicle.

The control means designed for selectively energizing the electrically controlled air switch which provides air pressure to each of the two actuators on the top fairing and side spoiler portions of the plurality of variable air deflector door panels is activated by the energizing of an electrically energized normally closed relay switch of conventional type directly connected to a low air pressure warning light/buzzer. When minimum operational auxiliary air pressure is generated, the low air pressure warning indicator light/buzzer is de-energized thus allowing the normally closed relay switching circuit system to close and complete the circuit and thereby allowing the accelerator electrical switch to be energized when the accelerator pedal is released thus supplying and electrical current to be electrically controlled air solenoid which selects pressurized air 35 P.S.I., or greater, being supplied to the switch from the vehicles auxiliary air supply routing pressurized air to each of the two dual action pneumatic actuators allowing the piston of each actuator to move to the closed or opened position, depending on the installed position of each actuator and mechanical attachments of the plurality of variable inlet guide door panels.

In addition to the primary electrical connections, the electrical supply initially originates from the vehicles power supply, such as the battery. The power or electrical wiring from the battery connects through the vehicles on position of the ignition switch system to a manual override switch located on the control panel with the selective ability to terminate the completion of the electrical circuit from the low pressure warning light/buzzer disallowing accelerator electrical switch and the electrically operated normally closed relay switch to provide an electrical current and power supply to the electrically operated air solenoid switching system controlling the selectivity of pressurized air for the pneumatic actuator system.

Upon depressing the accelerator pedal to continued acceleration, the energized switch attached for actuation by the throttle linkage or accelerator pedal is de-energized, thereby allowing the electrically actuated air solenoid switching valve to return to the close position.

A control switch limiting the actuation of the variable air deflector door panels below effective speeds such as 30 MPH in most applications is considered for application and attachments to the vehicles speedometer sensing terminals or the drive train such as the drive shaft immediately to the aft position of the vehicles main transmission by known and applied conventional means.

Other sensing applications of speeds could be considered to be mounted for speed sensing to the vehicles wheels. These types of sensors could be arranged to create an electrical pulse generation characteristic of a conventional method or by mechanical gearing known to conventional applications.

Figure 2:
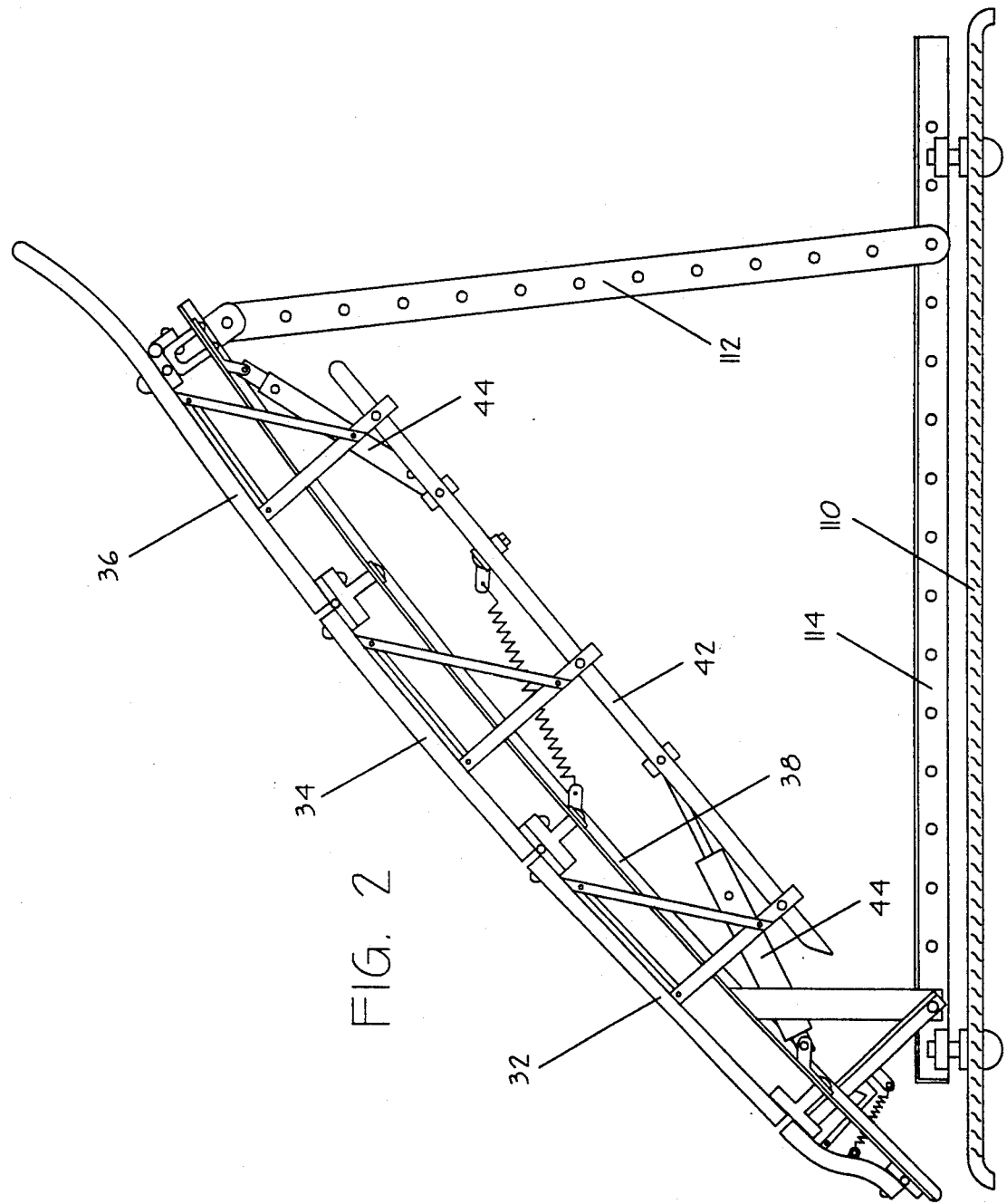
FIG. 2 is a side view of the plurality of movable deflector panels while in the closs position for use in fairing the air flow over and around the less aerodynamic surfaces of the vehicle.

In FIG. 2 the top of the cab 110 and wherein an adjustable support brace 114 is connected parallel with the roof of the cab. Another metal support brace 112 extends generally perpendicular to the brace 112 to support the upper end of the gates 36.

Figure 3:
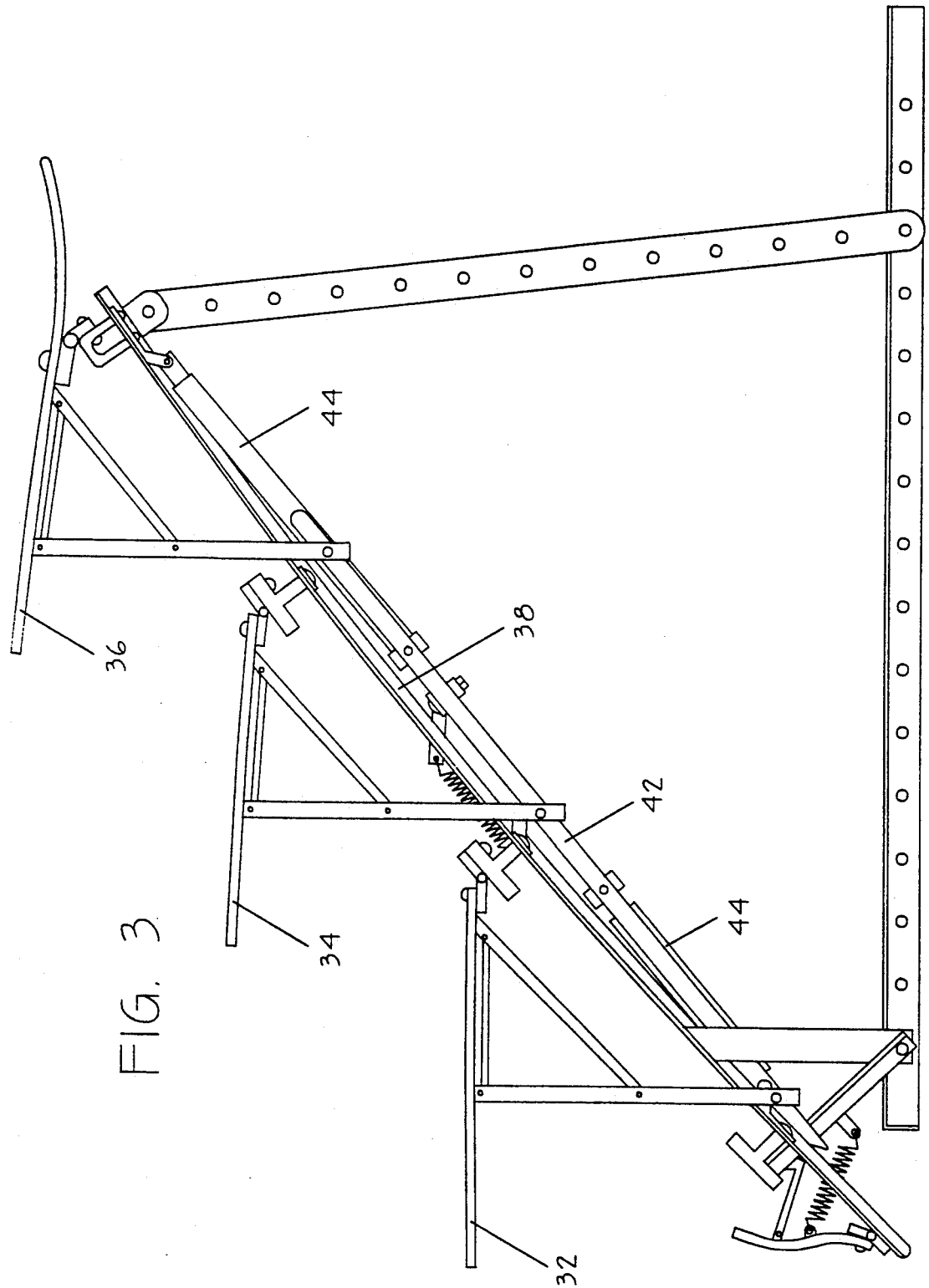
FIG. 3 is a side view of the plurality of movable deflector panels extended and open in a position for redirecting the air flowing over the deflector/fairing panel surfaces to impinge on the front face of the vehicles less aerodynamic surfaces.

Actuating rod 42 extends generally parallel with the gates 32, 34, and 36 when in the closed position. A pair of air operated devices are provided to open the gates 32, 34, 36 as shown in FIG. 3.

Figure 4:
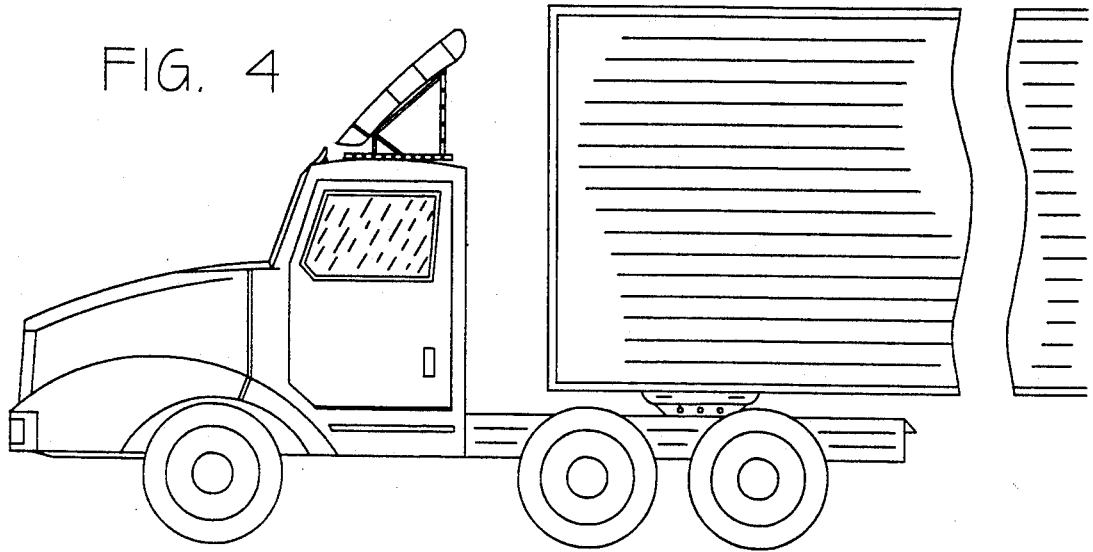
FIG. 4 is a side view of the complete top variable panel unit mounted to the cab roof top surfaces of a semitractor trailer truck and shown in the close position for use in fairing the air flow over the vehicles cargo trailer front surfaces.

FIG. 4 is a side elevation of a tractor with the air deflector in the closed position to direct air over the transport unit wherein a fifth wheel connector is between the truck and the cargo carrier.

Figure 5:
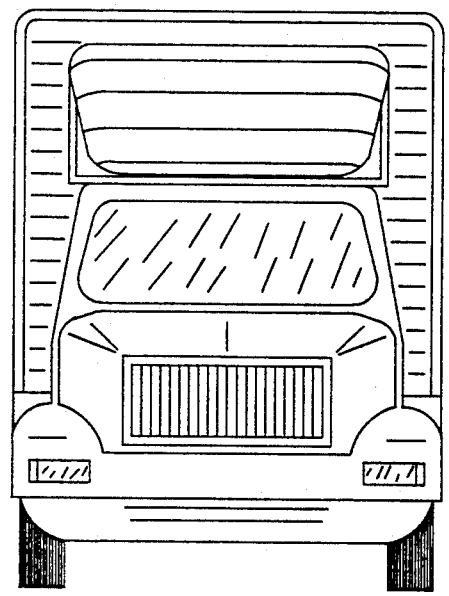
FIG. 5 is a front view of the complete top variable panel unit mounted to the cab roof top surfaces of a truck having a cargo compartment attached and providing air fairing characteristics to the vehicles cargo front surface area.

FIG. 5 is a front elevation of the unit illustrated in FIG. 4.

Figure 6:
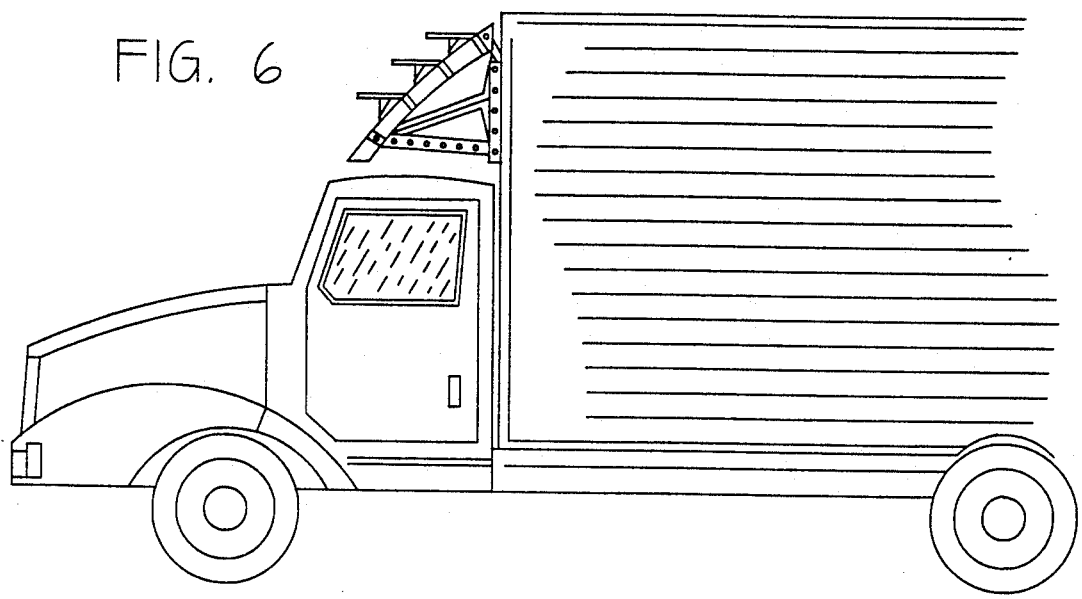
FIG. 6 is a side view of the plurality of movable door panel assemblies in the open position and mounted to the front face of the cargo compartment providing air drag and resistance to forward motion of the vehicle while slowing or stopping.

FIG. 6 is a side elevation of the construction wherein the transversely extending gates are secured to the front face of the cargo carrier.

Figure 7:
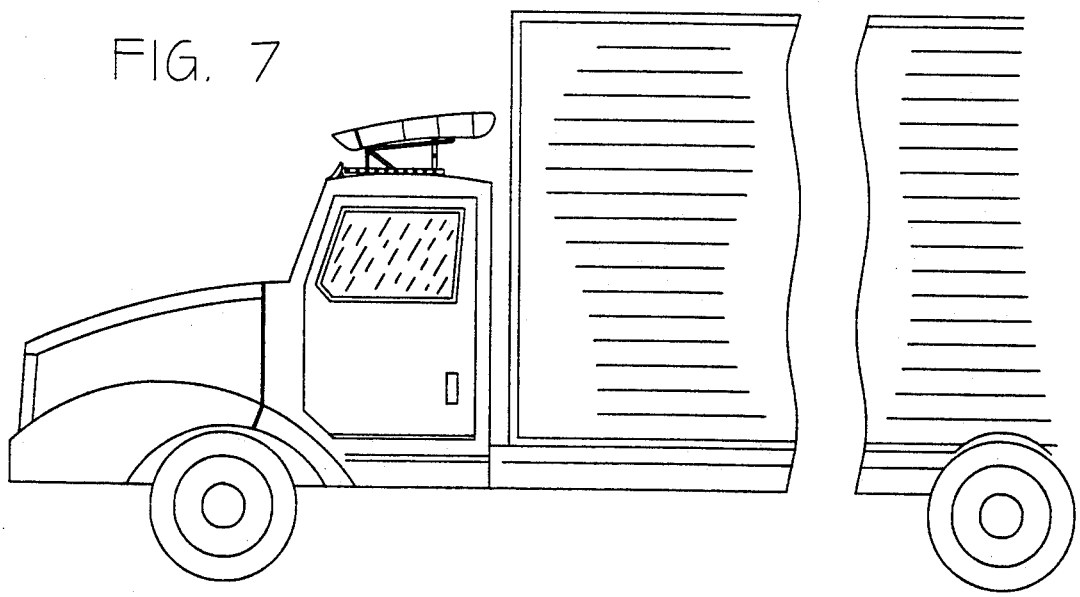
FIG. 7 is a side view of the plurality of movable panels mounted and adjusted to the horizontal position while not in use during maintenance, towing or other conditions requiring the plurality of movable panels to be made inoperative.

FIG. 7 is a side elevation of the gates positioned in the lowered or position for delivering the units.

Figure 8:
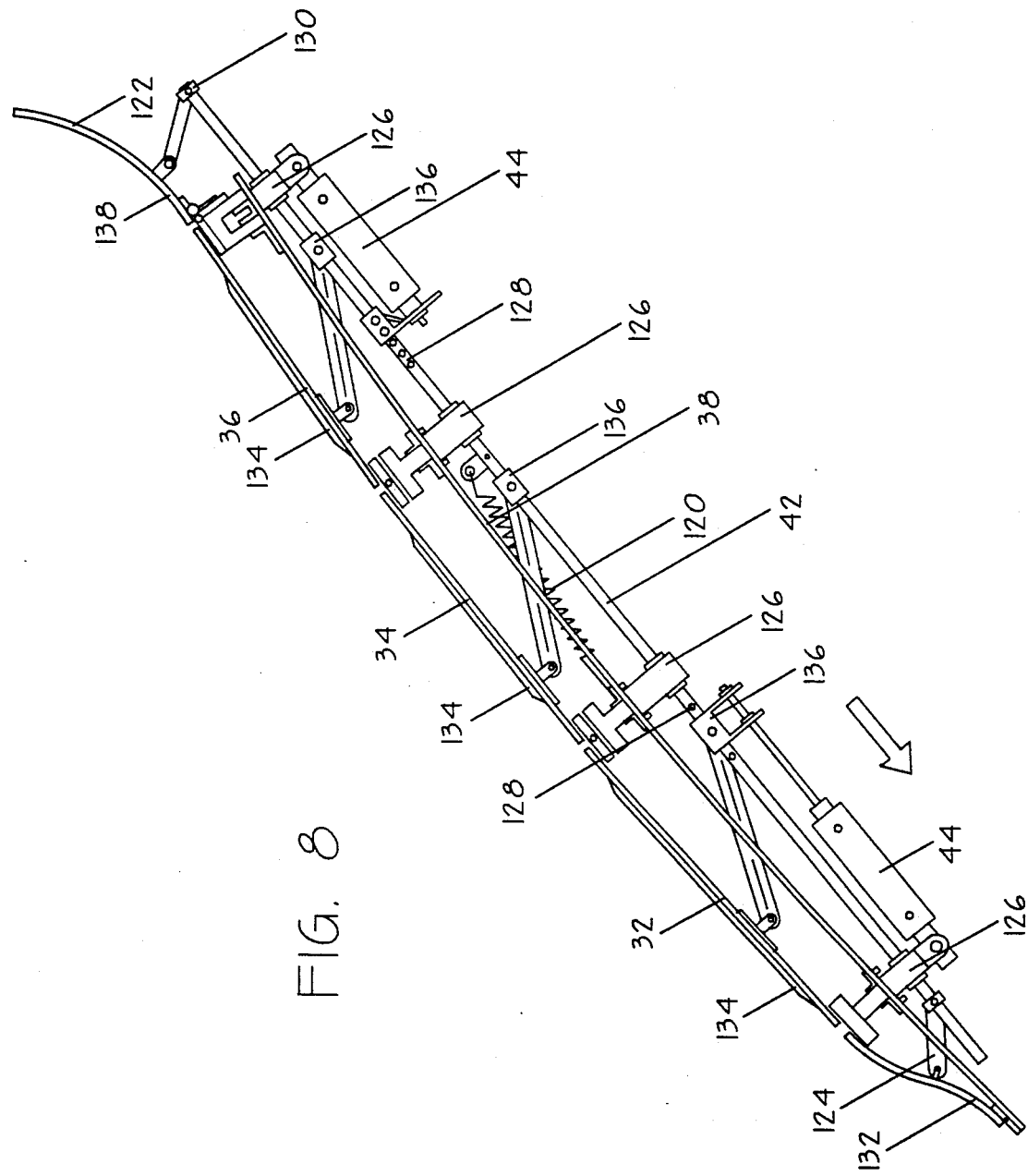
FIG. 8 is a side view with a cut away cross section showing the raised surfaces of each movable panels ribs and support members of the plurality of movable door panel assemblies and having a rear support bar structure that is designed to provide adjustment for the angle and height of the complete unit.

FIG. 8 is a side elevational view of the gate actuating devices wherein a single longitudinally movable rod actuates all of the gates regardless of how many are employed.

Figure 9:
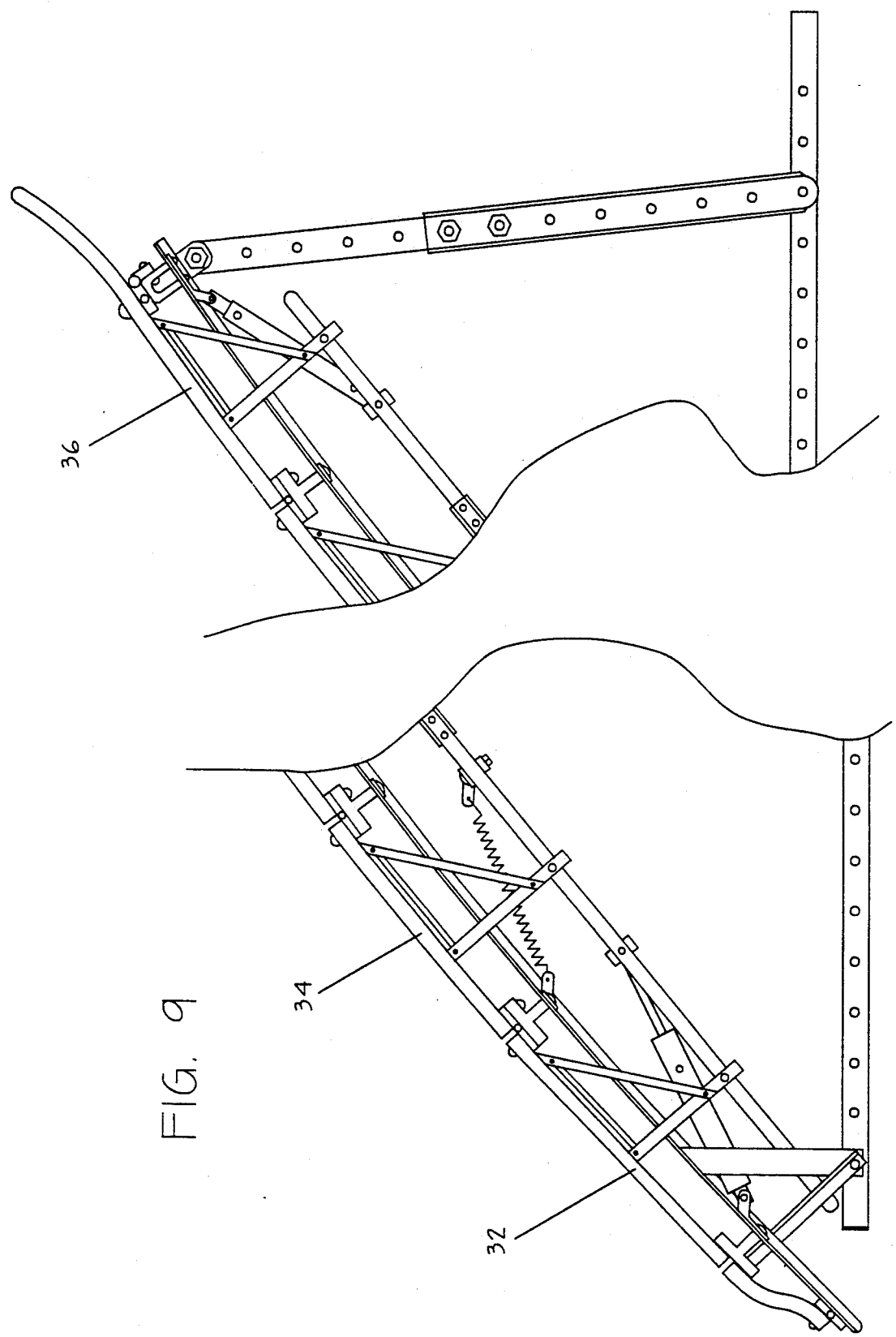
FIG. 9 is a side view of the plurality of tip movable panels illustrating the design feature are not bound by a set number of movable door panels and their respective linkages. Additional movable panels are considered to be needed on larger vehicle applications.

FIG. 9 is a view which illustrates how extra gates similar to the gates 32, 34, and 36 are employed.

Figure 10:
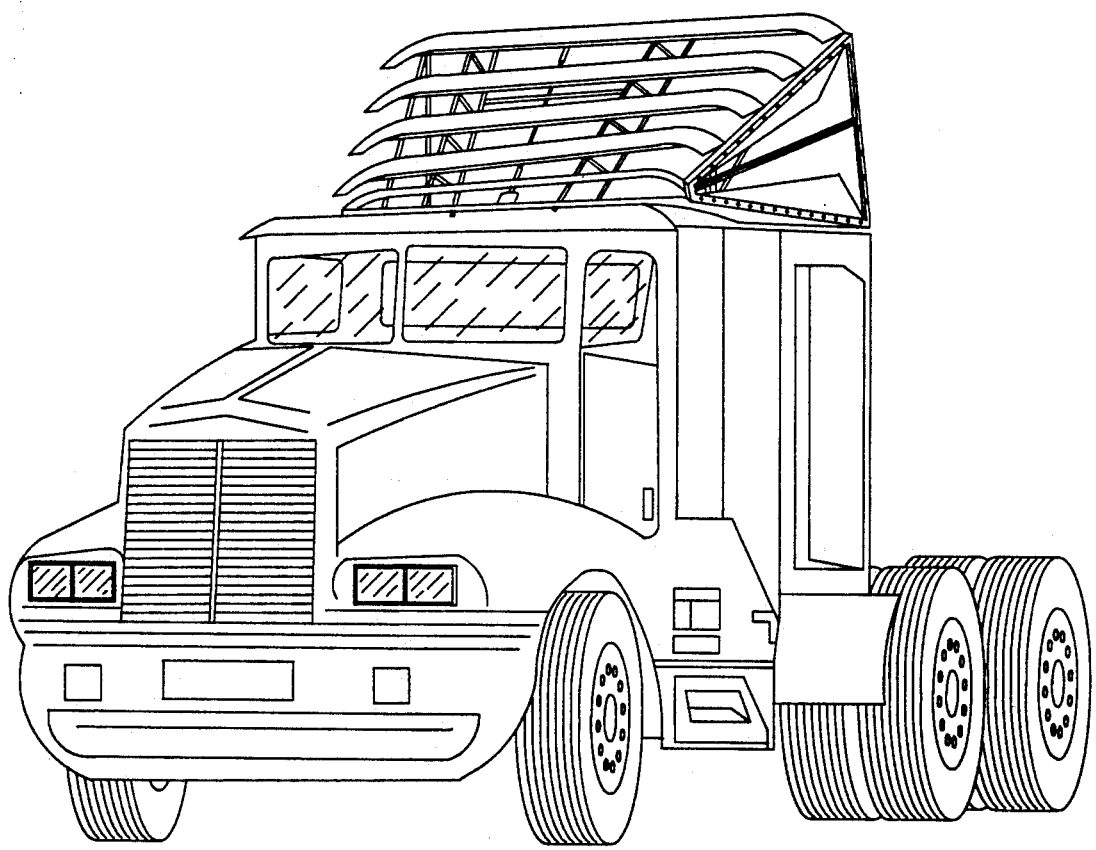
FIG. 10 is a 45 degree angle view of the plurality of movable door panels locked in the open position along with the side movable door panels locked in the open position for such operating conditions when air fairing is not needed during times of the tractor not coupled to a trailer, towing, vehicle delivery from factory or while pulling trailers such as flat beds not requiring aerodynamic air fairing.

FIG. 10 is a perspective view of the transversely extending gates and showing the air pressure actuated gates at the ends of the triangular members which are actuated when cross winds are present, and side elongated doors, hinged at the back are provided to permit additional air to the sides of the gates.

Figure 11:
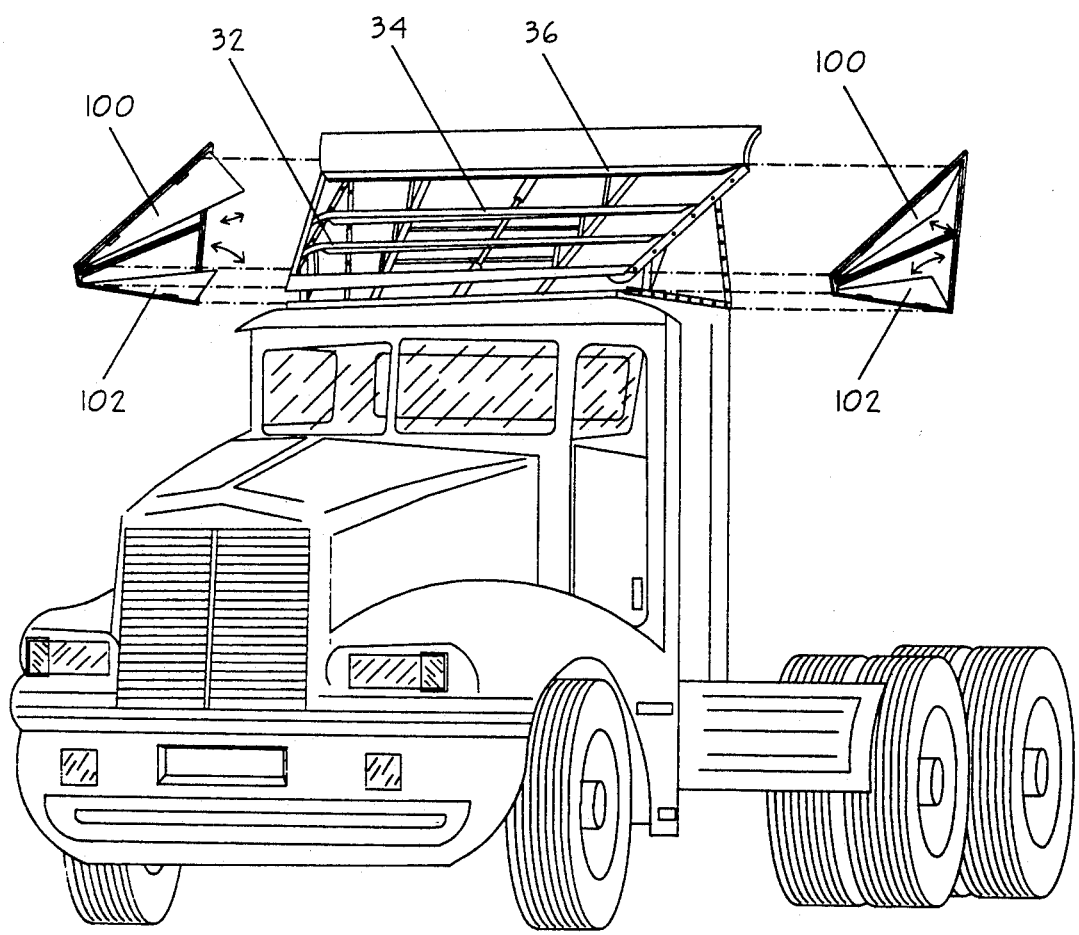
FIG. 11 is an angle view of the front and side of the plurality of movable door panel assemblies mounted to a cab and the sleeper compartment roof surfaces having illustrated an expanded or view of the detachable side movable panel assemblies of the variable deflector assembly.

FIG. 11 shows air pressure actuated gates which illustrate the cross winds.

Figure 12:
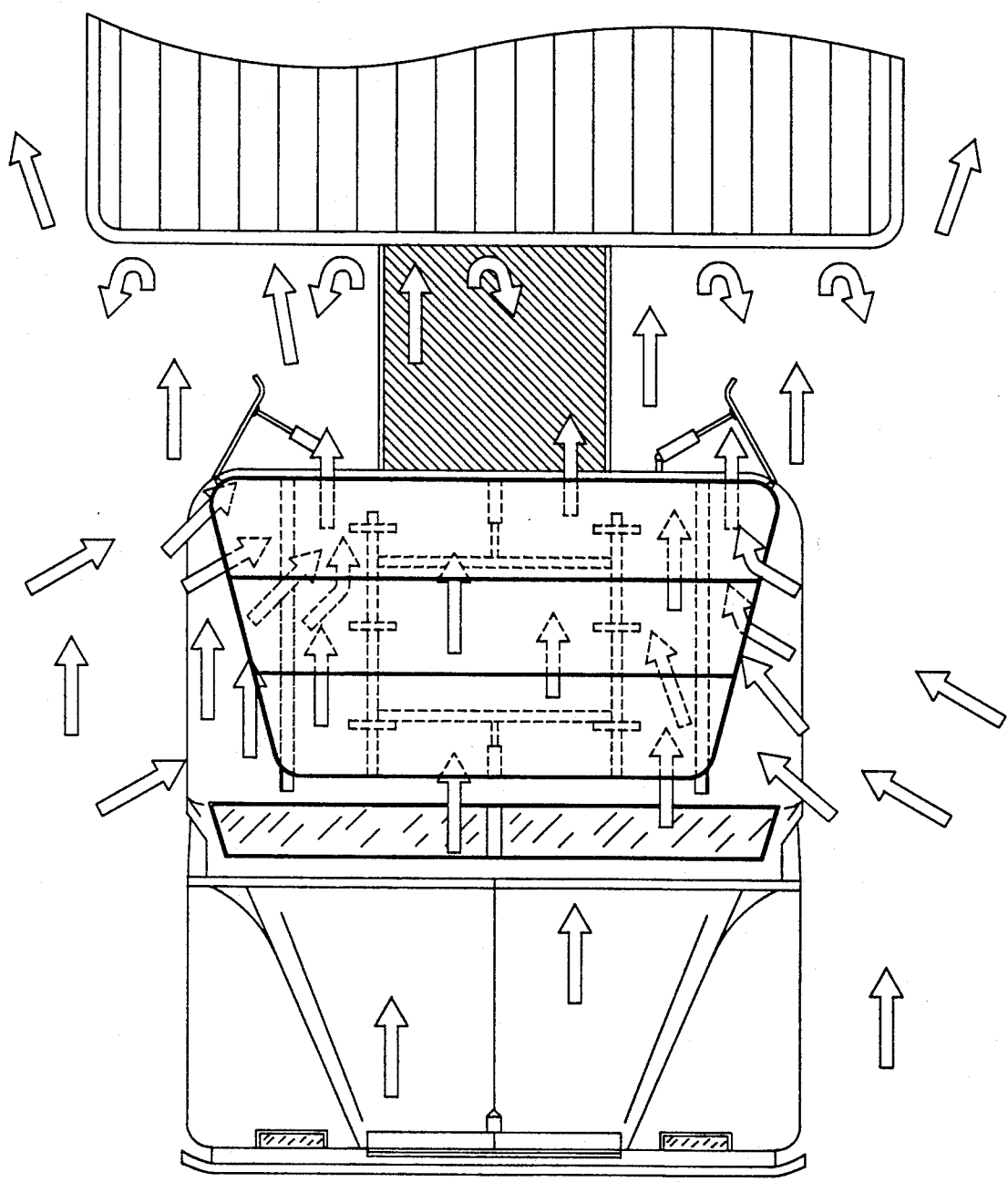
FIG. 12 is a top view of plurality of movable door panel assemblies illustrating the air flowing as redirected from the top, sides, and side extended movable door panels to impinge on the face of the cargo compartment.

FIG. 12 is a top plan view of the truck and cargo carrier showing the air flow when the gates are open.

Figure 13:
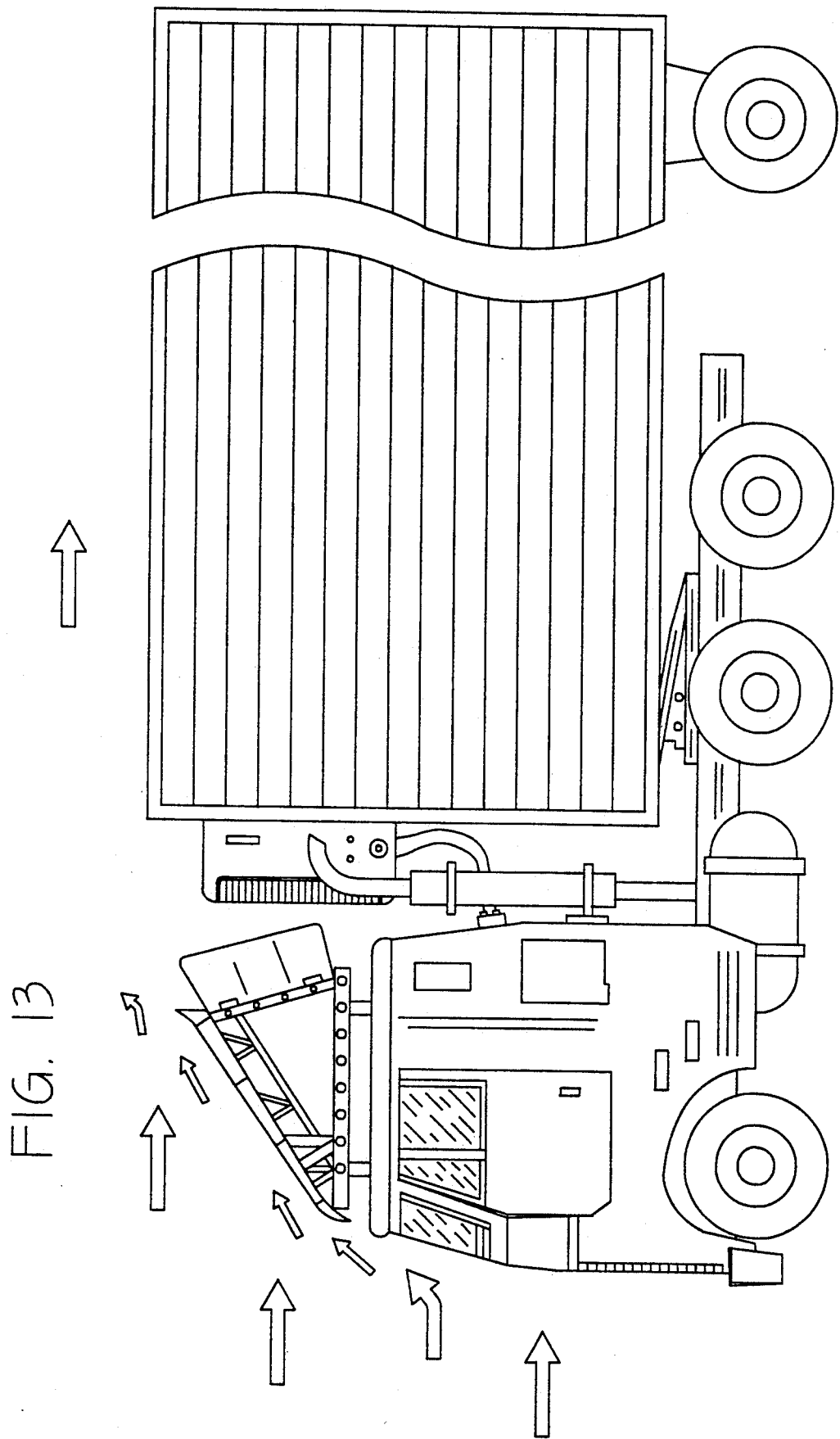
FIG. 13 is a side view of the plurality of movable panels and vertically hinge mounted side extenders fairing the air flowing over and around the sides of the vehicles refrigeration unit and cargo compartment while in the close position.

FIG. 13 shows the construction wherein the gates are closed and a refrigerator unit is positioned in the upper portion of the carrier to open the gates to cool the refrigeration unit in the event that the refrigeration unit over heats.

Figure 14:
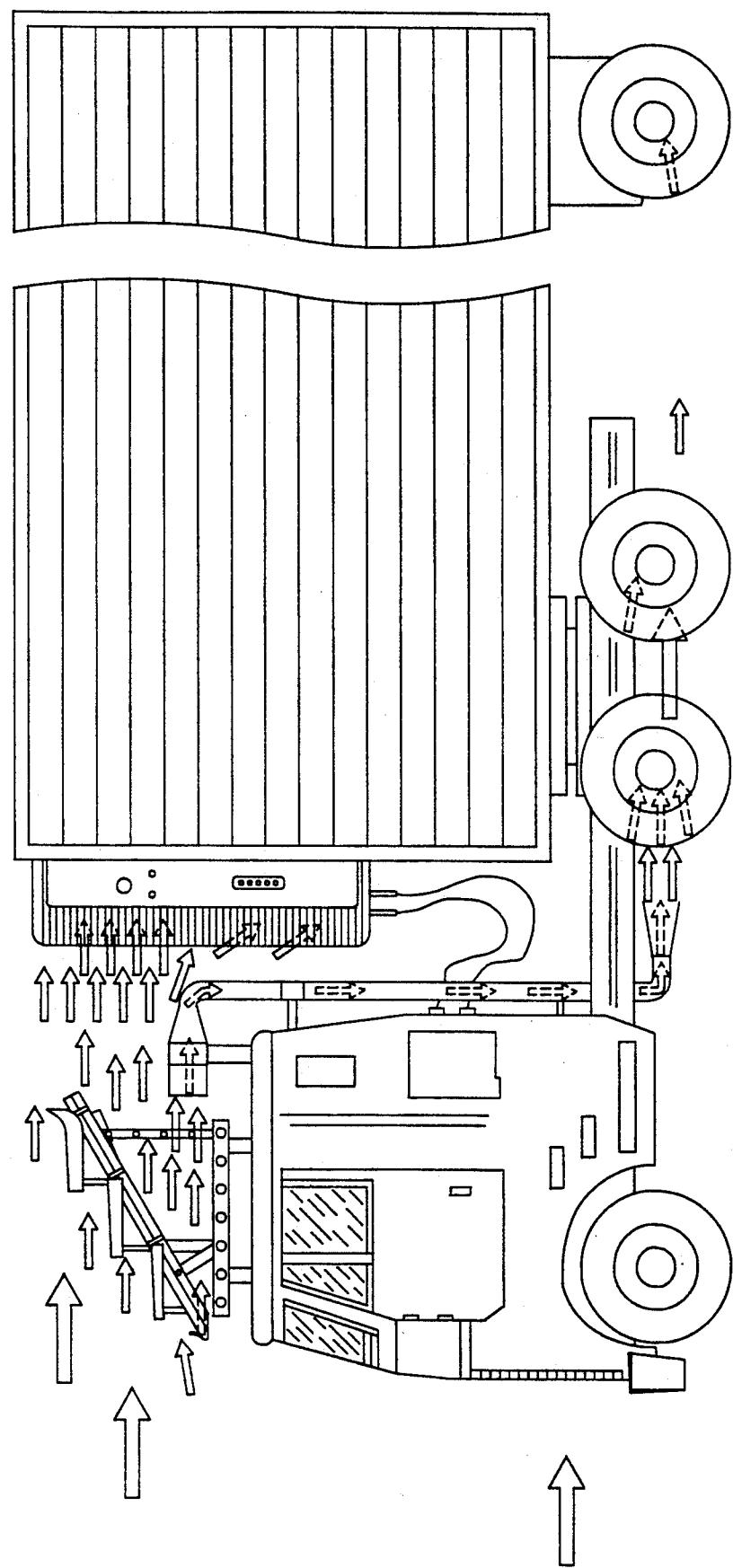
FIG. 14 is a side view of the plurality of movable door panels extended in the open position and redirecting the air flow toward the refrigeration unit for cooling and ventilation purposes, and to provide additional air flow for ventilation of the mechanical wheel brake assemblies located below the cargo compartment structure.

FIG. 14 is a view of the air forced down to cool the brakes in the event the gates are opened on release of the accelerator to cool the brakes to prevent the heating of the brakes to the extent that the brakes are inoperative.

FIG. 15 is a side elevation unit wherein a refrigeration unit is positioned on the cab of the truck so that the gates can be opened to prevent the refrigeration unit from over heating.

FIG. 16 is a side elevation of the unit with the gates open to render it easy to transport units that have been built or repaired.

FIG. 17 is side elevation with the gates in the stacked position to facilitate traveling.

FIG. 18 is a view of the air actuated gates at the opposite ends of the gates.

FIG. 19 is a view of different form of air actuated gates.

FIG. 20 is an illustrative view of the air guiding members.

FIGS. 21A, 21B are plan and side elevations of the stealthy aircraft. It is the use of a technology similar to the technology used in the to the stealth fighter and bomber, but only for the air flow problems. It prevents the air flow from being engulfed between the tractor and the trailer units.

Figure 1:
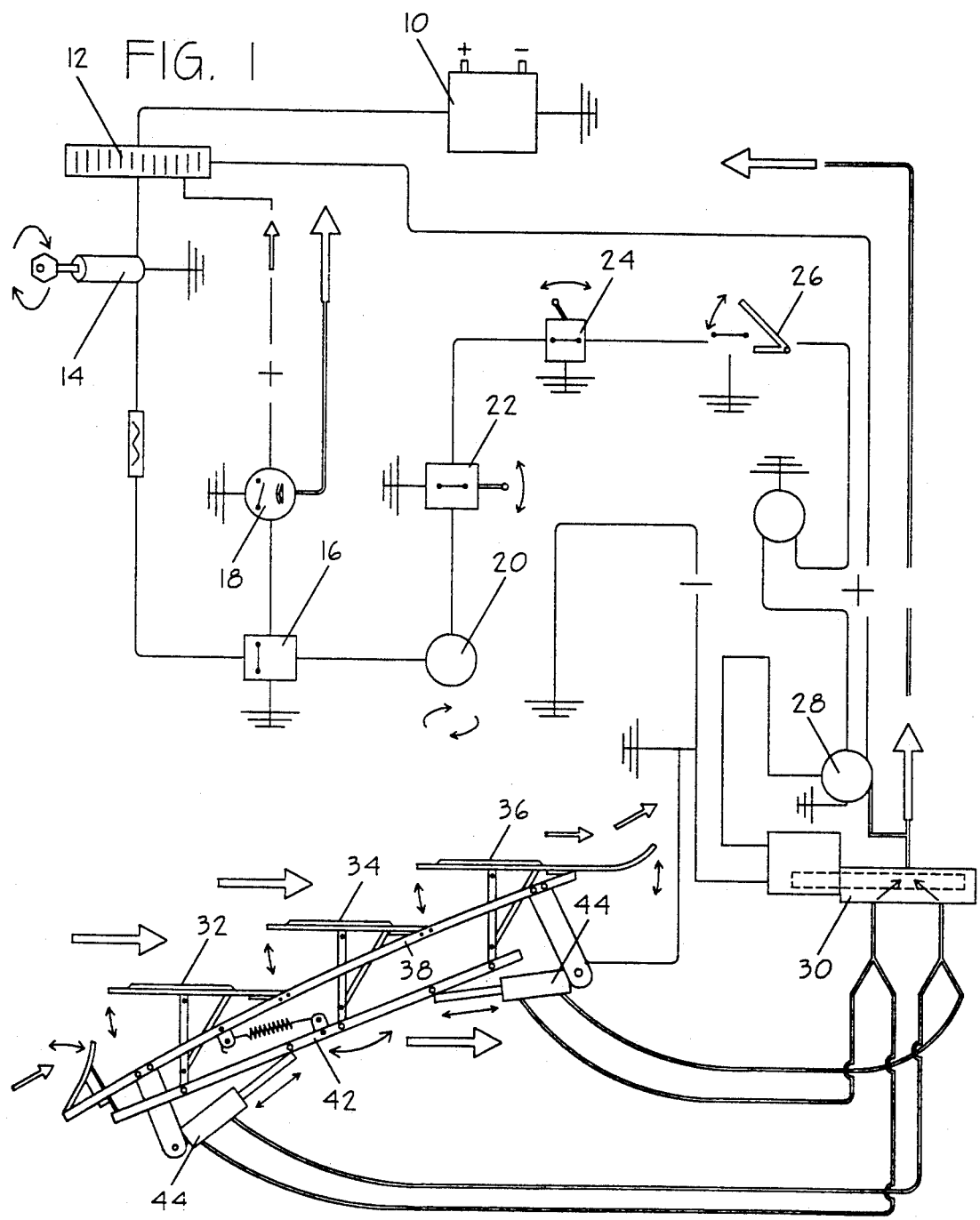
FIG. 1 is a side view of the plurality of movable door panels shown in the open position with the schematic diagram illustrating the operational design for incorporating into the use of the vehicles electrical and auxiliary compressed air supply.

Referring now to FIG. 1 to 3, the battery is illustrated at 10, the main fuse panel at 12, and the ignition lock and key at 14. A normally closed relay 16 is shown, and a low pressure warning switch is shown at 18, and that leads back to the main fuse panel 12.

A speed sensing switch 20 is operably connected to a clutch linkage delay switch 22, a manual override switch 24 is interposed in the circuit in which accelerator 26 is operably connected.

A low air pressure cut-off switch 28 is operably connected through the electrically operated switches 30 which controls the opening and closing of the gates 32, 34, and 36 in the angularly disposed ramp 38 leading from the top of the cab 38 leading from the top of the cab 38 to bridge the space between the top of the cab 38 and the top of the cargo carrier 40.

The gates 32, 34, and 36 are actuated by rods 42 operably connected to each of the gates 32, 34, and 36 and being pressure actuated by fluid pressure operated devices 44.

The controls are operated so that when the driver releases the accelerator 26, the gates 32, 34, and 36 are opened to direct a blast of air, depending on the speed at which the device is operating to direct the blast of air to impinge on the substantially flat front surface of the cargo carrier.

The controls are adjusted so that as soon as the driver releases the accelerator, either preparatory to applying the brakes, or merely to release gates so that they will open, and permit the blast of air at the speed at which the driver is going to release the air to strike the substantially flat front face of the cargo carrier to exert a partial braking effort force to slow down the cargo carrier toexert a partial braking effort force to slow down the cargo carrier to a certain degree, to exert an additional braking force dependent on the speed of the vehicle to be added to the braking force exerted by the brakes of the wheels.

While we have shown the device for illustrative purposes with three pivoted gates, it will be understood that a greater or a lesser number of gates may be employed.

The transversely extending gates 32, 34 and 36 when in the closed position as illustrated in FIG. 2 glide the air flowing over the cargo carrier.

Referring now to FIG. 11, one of the most difficult situations that a truck driver must contend with is cross winds that occasionally strike across the road in front of the driver, and exert a violent force depending on the contour of the road, his speed, and other factors.

The triangular shaped air pressure operated gates 100 and 102 which close the triangular space at the ends of the air deflector referred to in FIGS. 1, 2, and 3 showing the gates 32, 34, and 36 extending transversely across the vehicle to guide and deflect the passing air over the space between the cab of the tractor and the cargo trailer. The gates 100 and 102 are deflected inwardly to permit the cross winds to be abated so that the cross winds are no longer the serious problems that they formerly were. The effect is that the dangerous effects of the cross winds are substantially reduced.

Referring now to FIGS. 14 and 15 attention is directed to the fact that the additional cooling can be applied to the refrigeration unit, the refrigeration unit being positioned at the upper end of the cargo carrier and the cargo carrier being provided a fifth wheel whereby the unit can be hauled on a carrier provided by a fifth wheel, it being necessary and desirable that a sufficient distance be provided between the truck unit and the cargo carrier to permit the vehicle to make turns, it being necessary that an adequate spacing be provided between the truck unit and the cargo carrier to permit turning of the unit.

Referring now to FIG. 14, attention is directed to the fact that this construction embodies a construction wherein a refrigeration unit is positioned at the upper front portion of the cargo carrier and wherein sufficient clearance is provided between the units to permit steering of the vehicle.

One of the more important phases of this development is the fact that an air duct having an opening in front of the gates which when opened permit a blast of air depending on the speed of the vehicle to flow into the opening of the air duct intake for routing the air flow to the underside of the vehicle chassis. Attention is directed to the fact that additional conduits or pipes can be provided in the pipe so that air can be delivered to the braking mechanisms of the braking structures. It will also be noticed that air is provided to the rear wheels on the left and right hand sides of the cargo carrier. This ensures the cargo carrier of the additional air supplied at the speed of the vehicle. It will thus be noticed that the speed of the vehicle. It will thus be noted that the speed at which the assembly of truck and trailers are moving will thus be supplied to the braking mechanism which is recognized as being adequate to prevent a run away situation where there is not sufficient cooling of the brake mechanisms to cool the brakes.

Referring to FIG. 21B (combined with FIG. 13 showing the assembly of movable gates in the closed position for use in fairing the air flow over and past the combination tractor and cargo area).

Reduces air drag while the vehicle is traveling to increase efficiencies in fuel consumption and operating costs is the induction of the poorly faired air entering the space between the tractor cab body and the cargo front structural area.

This design reduces the patterns of swirling flow of unstable air passing over and around the front surfaces of the vehicle's hood, fenders, and windshield and allows the faired air flow to pass over and around the vehicles surfaces behind the fairing deflector shield.

The method is designed to improve slow the spinning and vortex generated air flow washing over and past these surfaces is located in the designed flat panel segments of the fairing surfaces starting at the leading edge of the fairing deflector panel and bonded together with other shaped flat panel segments with sharp radius edges and points of intersect.

I claim:
1. An air deflector for a transport vehicle having a tractor cab and a trailer with a refrigeration system for cooling the interior of the trailer and a braking system for the trailer, the air deflector comprising:
   A. a plurality of transversely extending air deflector gates mounted on top of the roof of the cab;
   B. the refrigeration system comprising a condenser mounted on the exterior front face of the trailer and adjacent to the air deflector gates to receive cooling air deflected from the gates;
   C. the trailer braking system comprising a wheel axle assembly attached to the lower surface of the trailer and brake components for the wheel axle assembly;

D. an air duct extending from the air deflector gates to the brake components of the trailer for providing cooling air to the brake components;

whereby the air deflector gates deflect cooling air to the condenser and furthermore deflect cooling air to the brake components of the trailer.

* * * * *